(12) United States Patent
Mirsky

(10) Patent No.: US 10,447,586 B2
(45) Date of Patent: Oct. 15, 2019

(54) DEFECT DETECTION IN IP/MPLS NETWORK TUNNELS

(71) Applicant: ZTE Corporation, Shenzhen (CN)

(72) Inventor: Gregory Mirsky, Pleasanton, CA (US)

(73) Assignee: ZTE Corporation, Shenzhen (CN)

( * ) Notice: Subject to any disclaimer, the term of this patent is extended or adjusted under 35 U.S.C. 154(b) by 30 days.

(21) Appl. No.: 15/611,748

(22) Filed: Jun. 1, 2017

(65) Prior Publication Data
US 2018/0351784 A1 Dec. 6, 2018

(51) Int. Cl.
*H04L 12/723* (2013.01)
*H04L 12/24* (2006.01)

(52) U.S. Cl.
CPC .......... *H04L 45/50* (2013.01); *H04L 41/0654* (2013.01)

(58) Field of Classification Search
CPC ..... H04L 45/50; H04L 41/0659; H04L 41/06; H04L 41/0654
USPC ........................................................ 370/216
See application file for complete search history.

(56) References Cited

U.S. PATENT DOCUMENTS

| 7,860,981 | B1 | 12/2010 | Vinokour et al. |
| 2006/0209685 | A1* | 9/2006 | Rahman .................. H04L 43/50 370/229 |
| 2009/0279440 | A1* | 11/2009 | Wong .................. H04L 41/0631 370/242 |
| 2012/0106359 | A1* | 5/2012 | Raszuk ............... H04L 43/0811 370/244 |
| 2015/0188814 | A1* | 7/2015 | Jain .......................... H04L 45/74 370/392 |
| 2016/0036695 | A1 | 2/2016 | Mirsky et al. |
| 2016/0119805 | A1* | 4/2016 | Aldana ................. H04L 43/106 370/252 |

FOREIGN PATENT DOCUMENTS

| CN | 102780593 A | 11/2012 |
| CN | 106789390 A | 5/2017 |

OTHER PUBLICATIONS

International Search Report and Written Opinion dated Aug. 2, 2018 for International Application No. PCT/CN2018/089109, filed May 31, 2018 (7 pages).

* cited by examiner

*Primary Examiner* — Rownak Islam
(74) *Attorney, Agent, or Firm* — Perkins Coie LLP

(57) ABSTRACT

This disclosure addresses improving the reliability of network connections between nodes, detection of failures of network connections, and the reduction of control packets exchanged between nodes. A second node may stop sending control packets to a first node causing a reduction in network throughput and increased network capacity. The network connection from the first node to the second may be of a first type and the connection from the second node to the first node may be of a second type. When a failure of the connection of the first type occurs, communication of the failure may be sent in a flag from the second node to the first node using the second type. A response to the flag received at the first node may be sent to the second node. The response may be sent using the second type of network connection because the first type failed.

24 Claims, 4 Drawing Sheets

DEFECT DETECTION IN IP/MPLS NETWORK TUNNELS

TECHNICAL FIELD

The present disclosure relates to data networks.

BACKGROUND

Electronic networks provide a backbone for high-speed digital communications between electronic devices such as computers, network connected devices such as storage devices, video devices, audio devices, control devices and others. The reliability of network connections between devices is important to the overall reliability of information systems such as those noted above. Sometimes network connectivity may be broken either because of a hardware failure, software failure, or other event that causes communications to stop. When this happens, the systems reliant on the network connectivity may fail as well. Reliable and effective methods of detecting and repairing network failures are useful to improve information system reliability.

SUMMARY

Apparatuses, methods, computer readable media, and systems are disclosed. In one aspect, a first network apparatus may include a transceiver at the first network apparatus coupled via a network to another transceiver at a second network apparatus. The first network apparatus may be configured to at least send a message to the second network apparatus to cause a bootstrapping of an asynchronous session with the second network apparatus. The first network apparatus may periodically send first control packets to the second network apparatus via a first network connection and periodically receive from the second network apparatus second control packets via a second network connection. The first network apparatus may further be configured to send, to the second network apparatus, in response to changing at the first network apparatus from the asynchronous session to a demand session, a third control packet via the first network connection to cause the second network apparatus to stop sending the second control packets to the first network apparatus. The first network apparatus may further receive, in a fourth control packet from the second network apparatus, a first flag via the second network connection indicating that the demand session from the first network apparatus to the second network apparatus has failed. The first network apparatus may send, by the first network apparatus, a fifth control packet with a second flag via a third network connection to cause the second network apparatus to stop sending the fourth control packet with the first flag. The first network apparatus may send, after sending the fifth packet, to the second network apparatus, a sixth control packet to restart the asynchronous session via the first network connection.

In another aspect, a second network apparatus may include a transceiver at the second network apparatus coupled via a network to another transceiver at a first network apparatus. The second network apparatus may be configured to at least receive a message from the first network apparatus to cause a bootstrapping of an asynchronous session with the first network apparatus. The second network apparatus may periodically receive first control packets from the first network apparatus and the second network apparatus may periodically send second control packets to the first network apparatus. The second network apparatus may be further configured to receive, from the first network apparatus, in response to changing at the first network apparatus from the asynchronous session to a demand session, a third control packet to cause the second network apparatus to stop sending the second control packets to the first network apparatus. The second network apparatus may be further configured to send, in a fourth control packet to the first network apparatus, a first flag indicating that the demand session between the first network apparatus to the second network apparatus has failed. The second network apparatus may be further configured to receive, from the first network apparatus, a fifth control packet with a second flag via a third network connection to cause the second network apparatus to stop sending the fourth control packet with the first flag. The second network apparatus may be further configured to receive, from the first network apparatus, a sixth control packet to restart the asynchronous session.

The following features may be included in the first network apparatus in any combination. The second network apparatus may determine that the demand session failed based on a predetermined number of the first control packets not being received from the first network apparatus, and wherein the second network apparatus periodically sends the fourth control packet. The asynchronous session and the demand session may operate using a bidirectional forwarding detection (BFD) protocol. The first flag may be a poll flag of the BFD protocol. The second flag may be a final flag of the BFD protocol. The first network connection may be a multiprotocol label switching (MPLS) label switched paths (LSP) connection. The second network connection may be an Internet protocol (IP) network connection. The third network connection may be an IP network connection. The MPLS LSP connection may operate using MPLS encapsulation. The IP network connections may operate using IP encapsulation. The network may include a plurality of routers. A network path from the first network apparatus to the second network apparatus may traverse the plurality of routers.

BRIEF DESCRIPTION OF THE DRAWINGS

Where possible, like reference numerals refer to the same or similar features.

DETAILED DESCRIPTION

Figure 1:
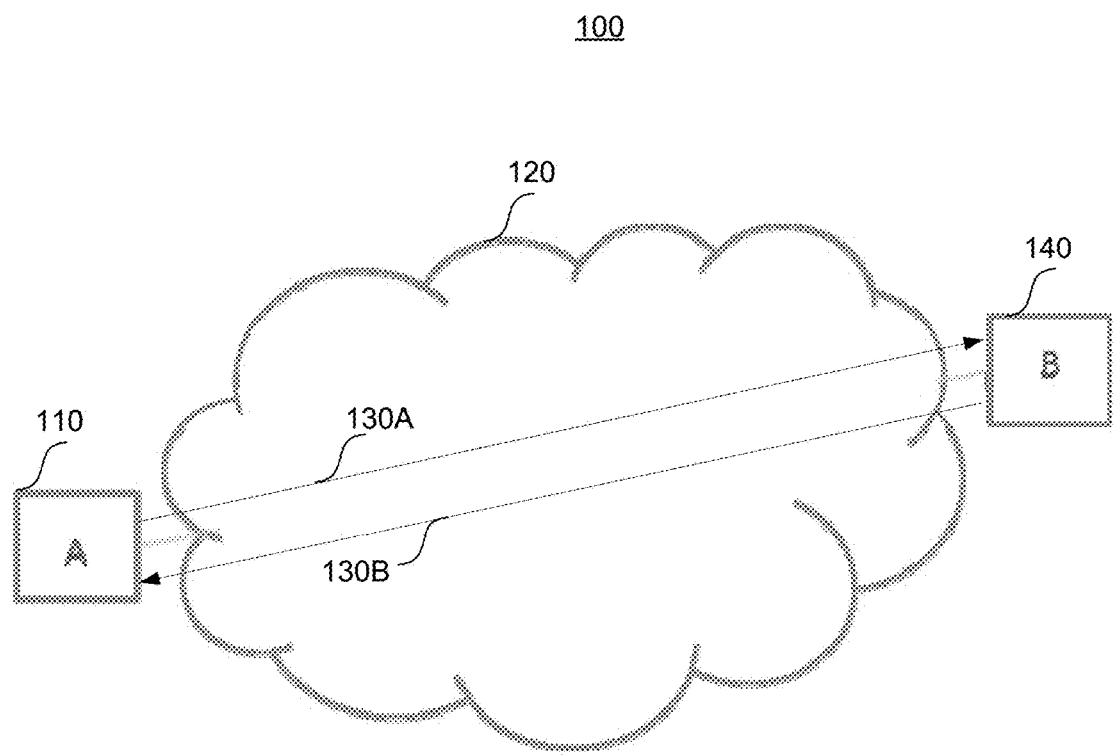
FIG. 1 depicts an example of a network connecting two nodes, in accordance with some example embodiments.

Nodes in a communications or data network communicate information to one another such as Internet data, file transfer data, video data, program data, user information, and may other types of data. Nodes may include network devices such as computers, video devices, Internet of Things (IoT) devices, network routers or other network devices. A connected node may send, receive, and/or exchange data with one other node, or more than one other node. The data may be sent across the network via one or more types of network connections. For example, data received by a network node may utilize a different network connection from data sent by the node. Nodes may connect through one network or through more than one network to reach a node.

As an illustrative example, a first node may be a router for an ingress of data and a second node may be another router for an egress of data. The data may be communicated from the ingress router, through the network, to the egress router. Communication from the first node to the second node may be via a first network connection such as a multiprotocol label switching (MPLS) label switched path (LSP) connection. A second network connection such as an Internet protocol (IP) connection may provide communication from the second node to the first node. In this example, in order to maintain the connections between the nodes, control packets may be sent periodically from the first node to the second node and from the second node to the first node. In one aspect of the disclosed subject matter, a command from the first node to the second may cause transmission of control packets from the second node to the first node to stop. By not sending the control packets from the second node to the first node, less data is sent from the second node to the first node thereby reducing the throughput because the control packets are no longer being sent. The processing at the first node and the second node is reduced because the second node no longer must generate and send the control packets to the first node, and the first node no longer has to receive and process the control packets from the second node. In this way, reduced throughput through the network and reduced processing at the network nodes increases the data capacity through the nodes and across the network. Control packets may continue to be sent periodically from the first node to the second node.

In another aspect, when a problem with the connection from the first node to the second node causes a predetermined number of control packets to be missed at the second node, a flag is set in a diagnostic field at the second node. The diagnostic field including the flag corresponding to the failure may be sent from the second node to the first node using a connection such as an IP connection that is different from the network connection between the first node to the second node such as an MPLS LSP connection. The first node may respond to the set flag by entering a session "down" state and setting a response flag to be sent to the second node. Normally, communication from the first node to the second node would utilize the first network connection such as an MPLS LSP connection, but because at least the predetermined number of consecutive control packets from the first node to the second node were not received and the missed packets were sent via the first network connection such as MPLS LSP connection, the response flag may be sent from the first node to the second node using the second network connection such as an IP connection. Because the diagnostic field including the flag was received via the second network connection, the second network connection may be more reliable. Accordingly the first node may be more likely to receive the response flag via the second network connection such as an IP connection than if the response flag were sent via the first network connection.

RFC 5880 entitled "Bidirectional Forwarding Detection (BFD)" and RFC 5884 entitled "Bidirectional Forwarding Detection (BFD) for MPLS Label Switched Paths (LSPs)," are both hereby incorporated by reference in their entirety.

FIG. 1 depicts an example of a network connecting two nodes, in accordance with some example embodiments. Node 110 may send data through network 120 that is received by node 140 via network connection 130A. Node 140 may send data through network 120 that is received by node 110 via network connection 130B.

Network connection 130A may utilize multiprotocol label switching (MPLS). MPLS may direct data from one network node to the next based on short path labels rather than long network addresses, thereby avoiding a routing table. The labels identify paths between nodes rather than endpoints. MPLS can encapsulate packets of various network protocols. In an MPLS network, data packets may be assigned labels. Packet-forwarding decisions may be made based on the contents of the label, without the need to examine the packet itself. This allows end-to-end circuits across any type of transport medium, using any protocol. MPLS operates at a layer that may be considered to lie between traditional definitions of open systems interconnection (OSI) layer 2 (data link layer) and layer 3 (network layer), and may be referred to as a layer 2.5 protocol. Label-switched paths (LSPs) may be established by a network operator for a variety of purposes, such as to create network-based IP virtual private networks or to route traffic along specified paths through the network.

Bidirectional forwarding detection (BFD) is a network protocol that may detect faults between two nodes connected by a link. BFD provides low-overhead detection of faults even on physical media that does not support failure detection, such as Ethernet, virtual circuits, tunnels, and MPLS label switched paths (LSPs). BFD establishes a session between two endpoints over a particular link. If more than one link is established between two nodes, multiple BFD sessions may be established to monitor each link.

Network connection 130A may utilize MPLS LSP network and a BFD protocol. Network connection 130B may utilize an Internet Protocol (IP) network and a BFD protocol.

Node 110 may be a router, computer or other network device. Node 140 may be a router, computer or other network device and may be the same type of device as node 110 or a different network device. Network 120 may include one or more nodes along a path from node 110 to node 140.

The disclosed subject matter may be incorporated into a router that performs segment routing. Segment routing provides for control of routing across a series of routers between two connected nodes. Segment routing may include one to tens of labels corresponding to routers along the route between two nodes.

Figure 2:
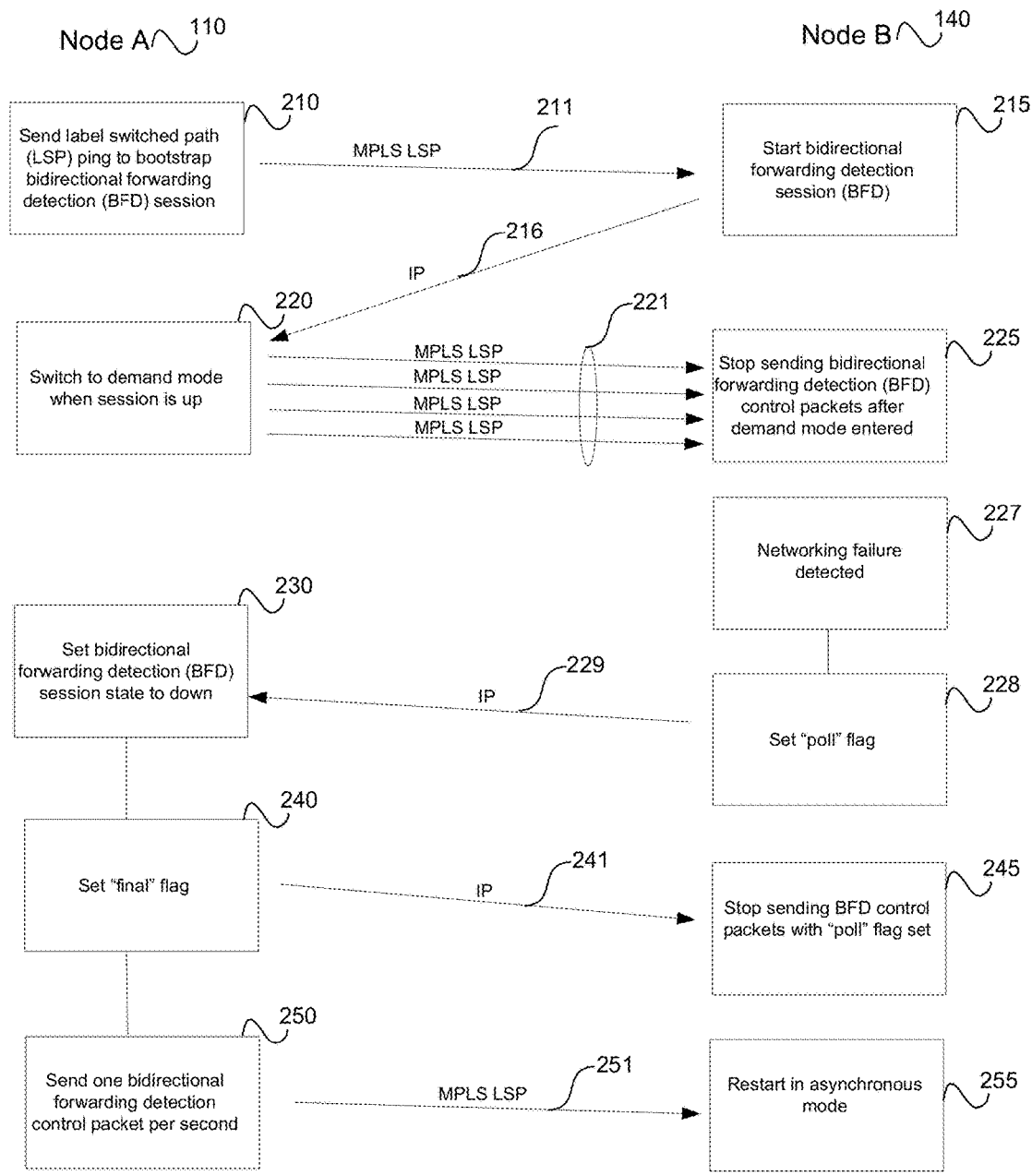
FIG. 2 depicts an example of data flow between two network nodes, in accordance with some example embodiments.

FIG. 2 depicts an example of data flow between two network nodes, in accordance with some example embodiments. The description of FIG. 2 also refers to FIG. 1. FIG. 2 depicts messages sent between node 110 and node 140. Messages sent from node 110 to node 140 are sent via MPLS LSP network connection 130A using BFD and messages sent from node 140 to node 110 are sent via IP network connection 130B using BFD unless otherwise noted below.

At 210, node 110 may send to node 140 message 211 to cause bootstrapping of an asynchronous BFD session with node 140. In an asynchronous session (also referred to as an asynchronous mode), node 110 may transmit BFD control packets to node 140 and node 140 may transmit BFD control packets to node 110. The message may be sent via the MPLS LSP network connection using the BFD protocol. Node 110 may be referred to as an ingress node and node 140 may be referred to as an egress node. For example, the message 211 may be a LSP ping message that causes the bootstrapping of the BFD session. The message may include a discriminator that identifies the session being initiated by the LSP ping from node 110.

At 215, upon receiving the message 211 including the discriminator from node 110, node 140 may start an asynchronous BFD session with node 110 via network connection 130A. Node 140 may start periodically sending BFD control packets including control packet 216 to node 110 via an IP network connection. The control packets may include one or more discriminators including the discriminator generated at node 140 and may include the discriminator received from node 110.

At 220, when a control packet 216 is received at node 110 from node 140, the asynchronous BFD session is "up" (i.e., the session is established). Once established, node 110 may switch from the BFD asynchronous mode to a BFD demand mode. An indication that the demand mode has been entered at node 110 may be sent in a control packet sent to node 140. Network connection 130A may operate in asynchronous mode or demand mode and network connection 130B may operate in asynchronous mode or demand mode. When in demand mode (also referred to as a demand session), a node may cause another node to stop transmission of periodic control packets. An event or command may cause a node in demand mode to again send a control packet or a sequence of control packets. An example of an event or command includes a failure to receive one or more control packets as described below. Which mode a node is in (demand mode of asynchronous mode) may be a characteristic of a BFD session. For example, node 110 may switch node 140 from an asynchronous mode to a demand mode. When in demand mode, node 140 may stop transmission of periodic control packets to node 110. Once demand has been entered, node 140 stops sending periodic control packets to node 110 and node 110 does not expect to receive any periodic control packets. As time progresses, node 110 sends periodic BFD control packets 221 to node 140. In regard to node 140, node 110 may continue to be in asynchronous mode. BFD control packets 221 may be sent with the time between control packets being a predetermined amount of time which depends of the application being supported by the network connections between nodes 110 and 140. The time between packets may be 3.3 milliseconds, 10 milliseconds, 50 milliseconds, 100 milliseconds or some other amount of time.

At 225, upon receiving the first control packet in 221, node 140 may stop sending control packets to node 110 as described above. Node 110 may continue to send periodic control packets to node 140, and node 140 may expect to periodically receive the control packets.

At 227, after a predetermined number of control packets are not received due to a problem or failure, node 140 may determine that a communications failure has occurred. For example, after a predetermined number of consecutive packets are not received at node 140 from node 110, node 140 may determine that a failure has occurred. For example, a failure may be determined when 3 packets, 4 packets, of any other number of consecutive control packets are missed. In another example, a failure may be determined when a predetermined total number of packets are missed over a period of time. For example, when 3 packets, 4 packets, or any other number of packets are missed in a 1 second sliding window of time, node 140 may determine that a communications failure has occurred. Any other time duration for the sliding window may be used instead of 1 second. In another example, a combination of a predetermined number of consecutive missed packets and total number of missed packets in a window of time may indicate that a failure has occurred.

At 228, after a determination that a communication or network failure has occurred at 227, a flag may be set. The "poll" flag may be sent from node 140 to node 110 in a request message. Because a failure has occurred, a diagnostic code in a diagnostic field may be set (also referred to as the remote defect indication (RDI)) indicating the failure.

The diagnostic message 229 and "poll" flag may be sent from node 140 to node 110 in a control packet via IP network connection 130B. Node 140 may continue transmission of BFD control packets with the "poll" flag set and the above mentioned value of the diagnostic field until it receives a BFD control packet from node 110 with a final flag set or the failure condition clears. For example, a failure condition may be cleared when node 140 again receives a control packet from node 110 via connection 130A.

At 230, upon receiving the message 229 with the "poll" flag and RDI in the diagnostic field set, node 110 may set the session state to "down." The poll flag may indicate that the BFD session from node 110 to node 140 via network connection 130A has failed. The failure in the connection 130A may be indicated by the RDI in the diagnostic field as described above.

At 240, node 110 switches back to an asynchronous BFD session. Node 110 may set a BFD control packet transmission rate to node 140 to a predetermined time between control packets such as one second or a predetermined packet rate such as one packet per second. Node 110 may transmit the BFD control packet with another flag set to cause node 140 to exit the "poll" and/or reset the "poll" flag. Node 110 may respond to the "poll" flag by sending a response message 214 including the setting of a "final" flag to acknowledge receipt of the RDI. For example, node 110 may set a "final" flag in a control packet message 241 sent to node 140 to cause node 140 to stop sending packets with the "poll" flag set. The previous control packets and messages sent from node 110 to node 140 were sent using the MPLS LSP network connection but control packet message 241 may be sent from node 110 to node 140 via an IP network connection because the IP network connection may be more reliable as described above with respect to FIG. 1. Sending the control packet message 241 via an IP network connection may be more reliable than via the MPLS LSP network connection because it is the MPLS LSP network connection that has failed which caused the missed control packets and setting of the "poll" flag at node 140 described with respect to 227 and 228 above.

At 245, upon receipt of the message from node 110 including the "final" flag, node 140 stops sending control packets to node 110 with the "poll" flag set. The "final" flag may cause node 140 to reset the "poll" flag."

At 250, node 110 may periodically send BFD control packets to cause a restart of an asynchronous BFD session from node 140 to node 110. In some embodiments, the initial discriminator exchanges at 211 and 216 do not need to be performed again and the session discriminators for the failed session may be reused in the restarted session.

Figure 3:
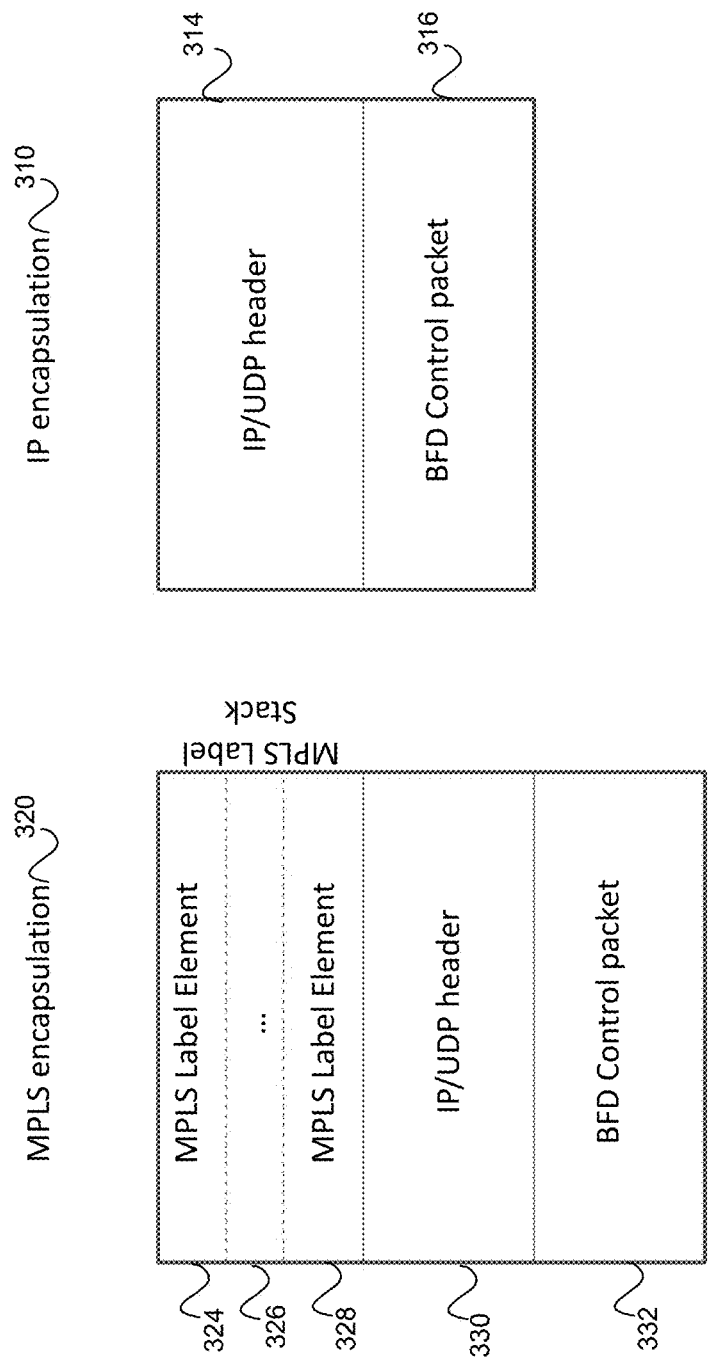
FIG. 3 depicts examples of encapsulation, in accordance with some example embodiments.

FIG. 3 depicts examples of encapsulation, in accordance with some example embodiments. The description of FIG. 3 also refers to FIGS. 1 and 2. At 310, an example of Internet protocol (IP) encapsulation is depicted and at 320 an example of multiprotocol label switching (MPLS) encapsulation is depicted.

Control packets and data passed via network connection 130B may be IP encapsulated. In some example embodiments, IP encapsulation may include a header such as an IP header or a user datagram protocol (UDP) header. A UDP header may include a source port identifier, a destination port identifier, a packet length, a checksum for error correction, and other information. An IP header may contain a source address, a destination address, a header checksum, protocol version, and other information. IP encapsulation of control and/or data packets from node 140 to node 110 includes adding the IP header to a data packet of a predetermined length. For example, an IP header 314 may be added to a BFD control packet 316. The encapsulated packet is sent from node 140 to node 110 via network connection 130B.

Control packets and data passed via network connection 130A may be multiprotocol label switching (MPLS) encapsulated. In some example embodiments, MPLS encapsulation may include appending one or more MPLS label elements to an IP encapsulated control packet. Each MPLS label element may include a label, a traffic class, a bottom of stack flag, a time-to-live field, and other information. The label may correspond to a router along a path from the ingress router such as node 110 to egress router such as node 140. Multiple MPLS elements may be appended where each label element corresponds to a different router along the path from node 110 to node 140. For example, a MPLS encapsulated packet may include one or more MPLS elements such as MPLS elements 324, 326, and 328 appended to an IP packet with IP/UDP header 330 and BFD control packet 332. The encapsulated packet may be sent from node 110 to node 140 via network connection 130A.

Figure 4:
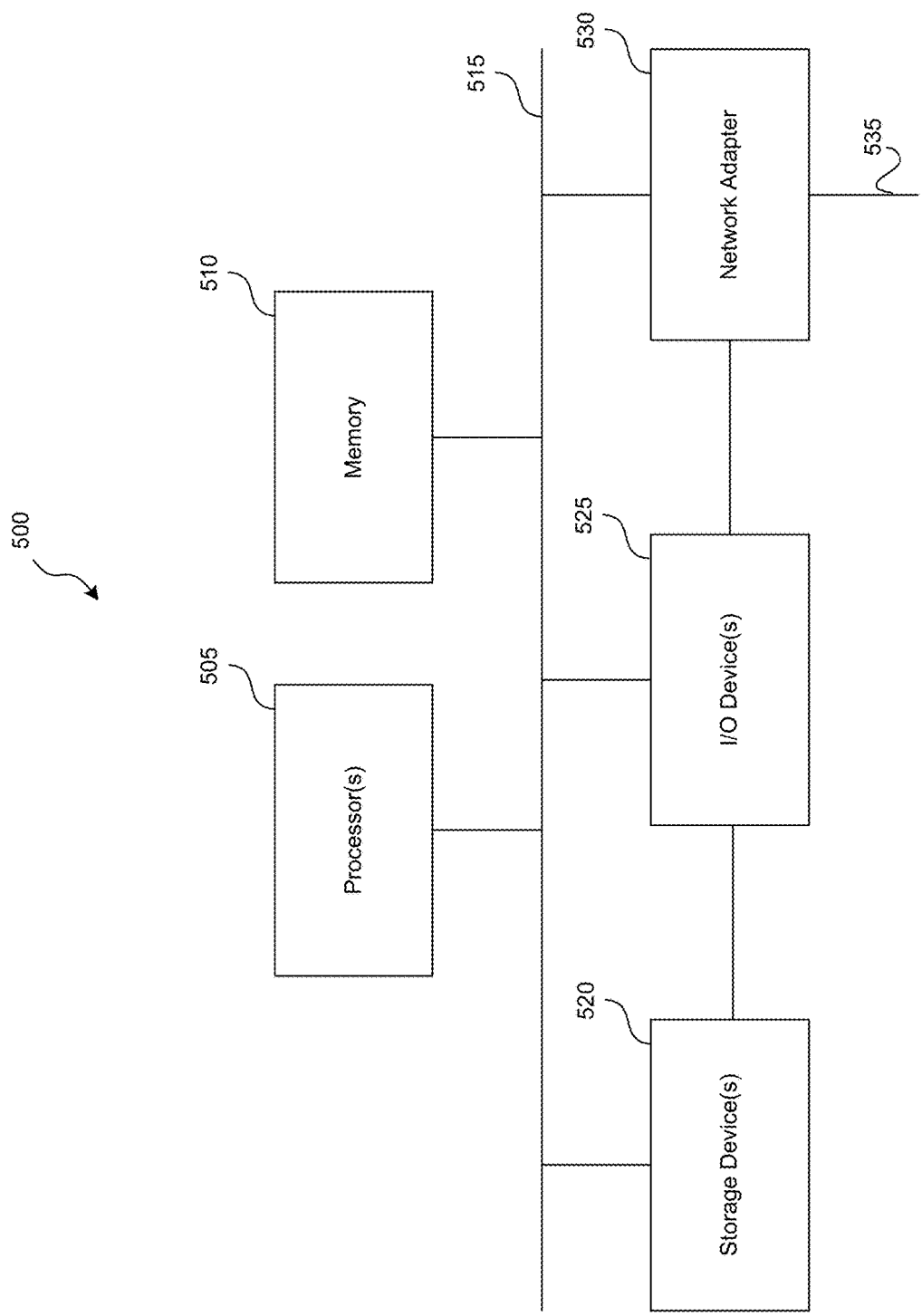
FIG. 4 depicts an example of an apparatus, in accordance with some example embodiments.

FIG. 4 depicts an example of an apparatus 500, in accordance with some example embodiments. The description of FIG. 4 also refers to FIGS. 1-3. Operations and management of the disclosed network node/router such as network nodes 110 and 140 may include an apparatus such as 500. In a network node, apparatus 500 may perform one or more of the operations described with respect to FIGS. 1-3. Apparatus 500 may also perform other status and control functions and include interfaces to other devices. Apparatus 500 may perform the BFD protocol, message generation and reception, control packet generation and reception as well as IP and/or MPLS encapsulation of control and/or data packets. FIG. 4 at 500 is a block diagram of a computing system, consistent with various embodiments such as network nodes, routers, and/or other network devices described above.

The computing system 500 may include one or more central processing units ("processors") 505, memory 510, input/output devices 525 (e.g., keyboard and pointing devices, display devices), storage devices 520 (e.g., disk drives), and network adapters 530 (e.g., network interfaces) that are connected to an interconnect 515. The interconnect 515 is illustrated as an abstraction that represents any one or more separate physical buses, point to point connections, or both connected by appropriate bridges, adapters, or controllers. The interconnect 515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 510 and storage devices 520 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 510 can be implemented as software and/or firmware to program the processor(s) 505 to carry out actions described above. In some embodiments, such software or firmware may be initially provided to the processing system 500 by downloading it from a remote system through the computing system 500 (e.g., via network adapter 530 or optical devices 540).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A first network apparatus, comprising:
a transceiver at the first network apparatus coupled via a network to another transceiver at a second network apparatus, the first network apparatus configured to at least:
send a message to the second network apparatus to cause a bootstrapping of an asynchronous session with the second network apparatus, wherein the first network apparatus periodically sends first control packets to the second network apparatus via a first network connection and periodically receives from the second network apparatus second control packets via a second network connection;
send, to the second network apparatus, in response to changing at the first network apparatus from the asynchronous session to a demand session, a third control packet via the first network connection to cause the second network apparatus to stop sending the second control packets to the first network apparatus, thereby reducing a throughput through the second network connection and increasing a data capacity across the second network connection and increasing a data capacity across the first network connection by reduced processing due to the stopped sending of the second control packets, wherein the first network connection is a multiprotocol label switching (MPLS) label switched paths (LSP) connection, the second network connection is an Internet protocol (IP) network connection;
receive, in a fourth control packet from the second network apparatus, a first flag via the second network connection indicating that the demand session from the first network apparatus to the second network apparatus has failed;
send, by the first network apparatus, a fifth control packet with a second flag via a third network connection to cause the second network apparatus to stop sending the fourth control packet with the first flag, wherein the third network connection is an IP network connection; and
send, after sending the fifth packet, to the second network apparatus, a sixth control packet to restart the asynchronous session via the first network connection.

2. The first network apparatus of claim 1, wherein the second network apparatus determined that the demand session failed based on a predetermined number of the first control packets not being received from the first network apparatus, and wherein the second network apparatus periodically sends the fourth control packet.

3. The first network apparatus of claim 1, wherein the asynchronous session and the demand session operate using a bidirectional forwarding detection (BFD) protocol.

4. The first network apparatus of claim 3, wherein the first flag is a poll flag of the BFD protocol.

5. The first network apparatus of claim 3, wherein the second flag is a final flag of the BFD protocol.

6. The first network apparatus of claim 1, wherein the MPLS LSP connection operates using MPLS encapsulation and the IP network connections operate using IP encapsulation.

7. The first network apparatus of claim 1, wherein the network comprises a plurality of routers, wherein a network path from the first network apparatus to the second network apparatus traverses the plurality of routers.

8. A second network apparatus, comprising:
a transceiver at the second network apparatus coupled via a network to another transceiver at a first network apparatus, the second network apparatus configured to at least:
receive a message from the first network apparatus to cause a bootstrapping of an asynchronous session with the first network apparatus, wherein the second network apparatus periodically receives first control packets from the first network apparatus via a first network connection and the second network apparatus periodically sends second control packets to the first network apparatus via a second network connection;
receive, from the first network apparatus, in response to changing at the first network apparatus from the asynchronous session to a demand session, a third control packet via the first network connection to cause the second network apparatus to stop sending the second control packets to the first network apparatus, thereby reducing a throughput through the second network connection and increasing a data capacity across the second network connection and increasing a data capacity across the first network connection by reduced processing due to the stopped sending of the second control packets, wherein the first network connection is a multiprotocol label switching (MPLS) label switched paths (LSP) connection, the second network connection is an Internet protocol (IP) network connection;
send, in a fourth control packet to the first network apparatus, a first flag indicating that the demand session between the first network apparatus to the second network apparatus has failed;
receive, from the first network apparatus, a fifth control packet with a second flag via a third network connection to cause the second network apparatus to stop sending the fourth control packet with the first flag, wherein the third network connection is an IP network connection; and
receive, from the first network apparatus, a sixth control packet to restart the asynchronous session.

9. The second network apparatus of claim 8, wherein the second network apparatus determined that the demand session failed based on a predetermined number of the first control packets not being received from the first network apparatus, and wherein the second network apparatus periodically sends the fourth control packet.

10. The second network apparatus of claim 8, wherein the asynchronous session and the demand session operate using a bidirectional forwarding detection (BFD) protocol.

11. The second network apparatus of claim 10, wherein the first flag is a poll flag of the BFD protocol.

12. The second network apparatus of claim 10, wherein the second flag is a final flag of the BFD protocol.

13. The second network apparatus of claim 8, wherein the MPLS LSP connection operates using MPLS encapsulation and the IP network connections operate using IP encapsulation.

14. The second network apparatus of claim 8, wherein the network comprises a plurality of routers, wherein a network path from the first network apparatus to the second network apparatus traverses the plurality of routers.

15. A method performed at a first network apparatus, comprising:

sending, to a second network apparatus, a message to cause a bootstrapping of an asynchronous session with the second network apparatus, wherein the first network apparatus periodically sends first control packets to the second network apparatus via a first network connection and periodically receive from the second network apparatus second control packets via a second network connection;

sending, to the second network apparatus, in response to changing at the first network apparatus from the asynchronous session to a demand session, a third control packet via the first network connection to cause the second network apparatus to stop sending the second control packets to the first network apparatus, thereby reducing a throughput through the second network connection and increasing a data capacity across the second network connection and increasing a data capacity across the first network connection by reduced processing due to the stopped sending of the second control packets, wherein the first network connection is a multiprotocol label switching (MPLS) label switched paths (LSP) connection, the second network connection is an Internet protocol (IP) network connection;

receiving, in a fourth control packet from the second network apparatus, a first flag via the second network connection indicating that the demand session from the first network apparatus to the second network apparatus has failed;

sending, by the first network apparatus, a fifth control packet with a second flag via a third network connection to cause the second network apparatus to stop sending the fourth control packet with the first flag, wherein the third network connection is an IP network connection; and sending, after sending the fifth packet, to the second network apparatus, a sixth control packet to restart the asynchronous session via the first network connection.

16. The method performed at the first network apparatus of claim 15, wherein the second network apparatus determined that the demand session failed based on a predetermined number of the first control packets not being received from the first network apparatus, and wherein the second network apparatus periodically sends the fourth control packet.

17. The method performed at the first network apparatus of claim 15, wherein the asynchronous session and the demand session operate using a bidirectional forwarding detection (BFD) protocol.

18. The method performed at the first network apparatus of claim 17, wherein the first flag is a poll flag of the BFD protocol.

19. The method performed at the first network apparatus of claim 17, wherein the second flag is a final flag of the BFD protocol.

20. A method performed at a second network apparatus, comprising:

receiving, at the second network apparatus, a message from a first network apparatus to cause a bootstrapping of an asynchronous session with the first network apparatus, wherein the second network apparatus periodically receives first control packets from the first network apparatus via a first network connection and the second network apparatus periodically sends second control packets via a second network connection to the first network apparatus;

receiving, from the first network apparatus, in response to changing at the first network apparatus from the asynchronous session to a demand session, a third control packet via the first network connection to cause the second network apparatus to stop sending the second control packets to the first network apparatus, thereby reducing a throughput through the second network connection and increasing a data capacity across the second network connection and increasing a data capacity across the first network connection by reduced processing due to the stopped sending of the second control packets, wherein the first network connection is a multiprotocol label switching (MPLS) label switched paths (LSP) connection, the second network connection is an Internet protocol (IP) network connection;

sending, in a fourth control packet to the first network apparatus, a first flag indicating that the demand session between the first network apparatus to the second network apparatus has failed;

receiving, from the first network apparatus, a fifth control packet with a second flag via a third network connection to cause the second network apparatus to stop sending the fourth control packet with the first flag, wherein the third network connection is an IP network connection; and receiving, from the first network apparatus, a sixth control packet to restart the asynchronous session.

21. The method performed at the second network apparatus of claim 20, wherein the second network apparatus determined that the demand session failed based on a predetermined number of the first control packets not being received from the first network apparatus, and wherein the second network apparatus periodically sends the fourth control packet.

22. The method performed at the second network apparatus of claim 20, wherein the asynchronous session and the demand session operate using a bidirectional forwarding detection (BFD) protocol.

23. The method performed at the second network apparatus of claim 22, wherein the first flag is a poll flag of the BFD protocol.

24. The method performed at the second network apparatus of claim 22, wherein the second flag is a final flag of the BFD protocol.

* * * * *